(12) United States Patent
Armstrong et al.

(10) Patent No.: US 8,556,065 B2
(45) Date of Patent: Oct. 15, 2013

(54) CONTENT DISPLAY FOR USE WITH CONVEYOR SYSTEMS

(76) Inventors: Stephen William Armstrong, Dennisville, NJ (US); Michael Samuel Lagana, Belleplain, NJ (US)

( * ) Notice: Subject to any disclaimer, the term of this patent is extended or adjusted under 35 U.S.C. 154(b) by 80 days.

(21) Appl. No.: 13/029,615

(22) Filed: Feb. 17, 2011

(65) Prior Publication Data

US 2011/0198199 A1 Aug. 18, 2011

Related U.S. Application Data

(60) Provisional application No. 61/305,261, filed on Feb. 17, 2010.

(51) Int. Cl.
*G09F 19/22* (2006.01)
*G09F 23/00* (2006.01)
*B65G 47/00* (2006.01)

(52) U.S. Cl.
USPC .......................... 198/502.1; 40/524

(58) Field of Classification Search
USPC ............................ 198/502.1; 40/472, 524–528
See application file for complete search history.

(56) References Cited

U.S. PATENT DOCUMENTS

| | | | | |
|---|---|---|---|---|
| 5,165,526 A | * | 11/1992 | Conklin, Jr. .................. | 198/804 |
| 5,244,080 A | * | 9/1993 | Bierbaum ................... | 198/502.1 |
| 5,311,980 A | * | 5/1994 | Munkner et al. ........... | 198/502.1 |
| 5,330,044 A | | 7/1994 | Conklin, Jr. | |
| 5,427,227 A | * | 6/1995 | Crandall et al. ........... | 198/502.1 |
| 6,186,314 B1 | | 2/2001 | Conklin, Jr. | |
| 6,260,693 B1 | * | 7/2001 | Mohr ............................ | 198/850 |
| 6,698,577 B1 | | 3/2004 | Conklin, Jr. et al. | |
| 6,910,293 B1 | | 6/2005 | Armstrong et al. | |
| 7,827,713 B2 | | 11/2010 | Gleeson et al. | |

FOREIGN PATENT DOCUMENTS

| | | |
|---|---|---|
| WO | WO 94/14689 | 7/1994 |
| WO | WO 01/05689 | 1/2001 |
| WO | WO 2011/103279 | 8/2011 |

OTHER PUBLICATIONS

International Patent Application No. PCT/US2011/025230: International Search Report dated Jul. 6, 2011, 3 pages.

* cited by examiner

*Primary Examiner* — Mark A Deuble
(74) *Attorney, Agent, or Firm* — Woodcock Washburn LLP

(57) ABSTRACT

Systems and methods for displaying content in a conveyor system are provided. A content displaying conveyor plate includes a base plate and an upper plate that is configured to be releasably coupled to the base plate. The upper plate can be configured to display content, for example content that is integral to the base plate, content that is disposed between the upper plate and the base plate, or any combination thereof. The upper plate can be coupled to the base plate via one or more connection members defined on the upper plate and/or the base plate. Any, number, such as all of the base plates of an existing conveyor system can be replaced with respective content displaying conveyor plates. The base plate of the content displaying conveyor plate can define one or more recesses, the recesses configured to receive an attachment member and/or other components of a carousel therein.

22 Claims, 4 Drawing Sheets

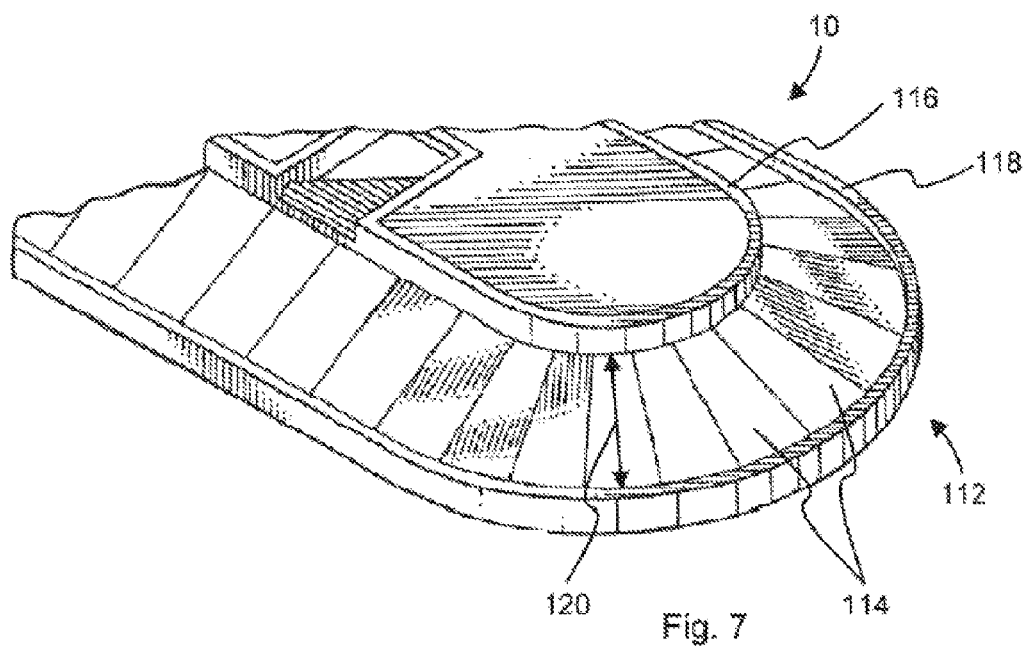
Fig. 7
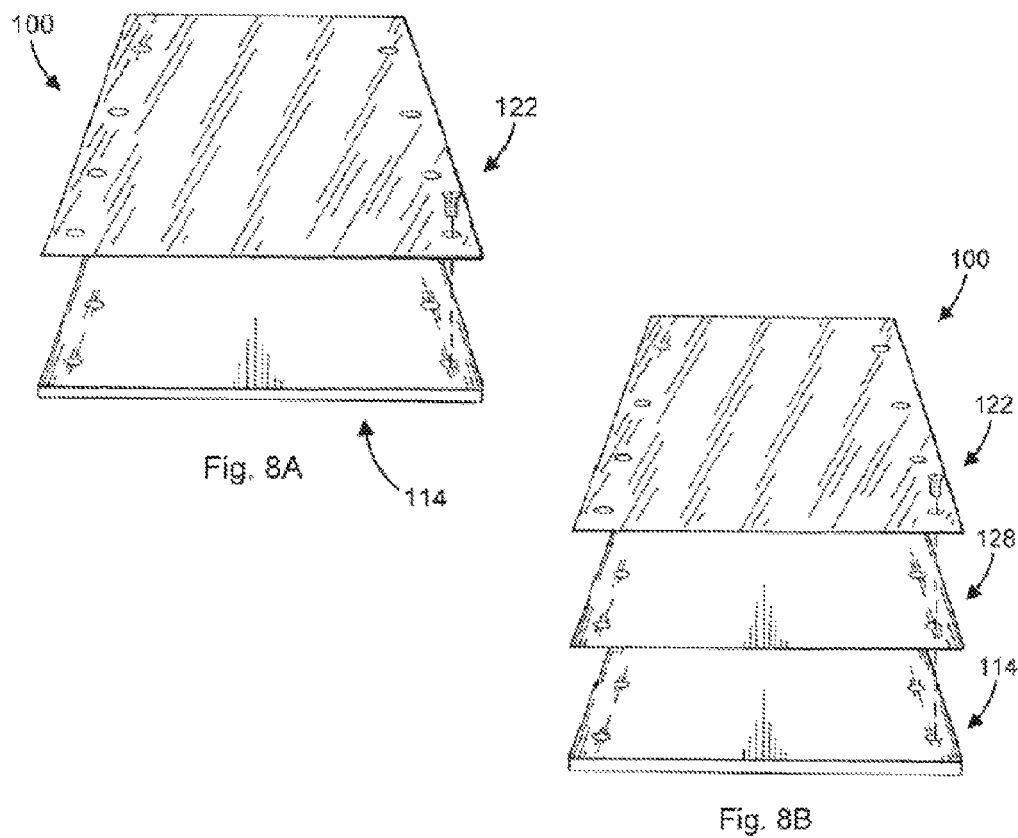
Fig. 8A
Fig. 8B

CONTENT DISPLAY FOR USE WITH CONVEYOR SYSTEMS

CROSS-REFERENCE TO RELATED APPLICATIONS

This patent application claims priority to U.S. provisional patent application No. 61/305,261, filed Feb. 17, 2010, which is incorporated herein by reference in its entirety.

TECHNICAL FIELD

This invention relates generally to systems and methods for displaying content and more particularly to systems and methods for displaying advertising content in conveyor systems.

BACKGROUND

Conveyor systems may be used in a wide range of applications. Such applications include baggage handling at airports, automated distribution, and warehousing, to name a few. In general, conveyor systems enable movement of items along an endless loop of conveyor system base plates. Baggage carousels deployed at airports present an opportunity for advertisers to display content to a captive audience of travelers waiting to retrieve their luggage. By affixing advertising content to the moving base plates of a baggage carousel, advertisers can effectively expose the majority of travelers congregated in the area of the baggage carousel.

However, conventional baggage carousel advertising systems often require significant time, effort, and expense in order to deploy and/or maintain. For example, baggage carousel advertising systems that display content in recessed cavities defined in the surfaces of the carousel base plates often provide less than the full amount of viewable, or "rail-to-rail" advertising space between the rails of the conveyor system. In another example, baggage carousel advertising systems that operate by wrapping the carousel base plates with an adhesive coating containing the advertising content are typically difficult to remove, thereby making the process of changing the advertising content both time consuming and labor intensive.

SUMMARY

In accordance with one embodiment, a content displaying conveyor plate includes a base plate that defines at least one first connection member. The base plate has an upper surface and an opposing lower surface configured to be attached to a conveyor system. The content displaying conveyor plate further includes an upper plate that defines at least one second connection member. The upper plate has a contact surface and a display surface. The upper plate is configured to be releasably coupled to the upper surface of the base plate such that content is displayed by the upper plate. A content displaying conveyor system can be constructed using a plurality of content displaying conveyor plates. A conveyor system base plate can be modified to display content by defining at least one connection member in at least one base plate of an assembled conveyor system and releasably coupling an upper plate to the at least one base plate. The at least one connection member is configured to couple the at least one upper plate to the at least one base plate.

BRIEF DESCRIPTION OF THE DRAWINGS

The foregoing summary, as well as the following detailed description of the preferred embodiments of the application, will be better understood when read in conjunction with the appended drawings. For the purposes of illustrating the content display for use with conveyor systems, there are shown in the drawings preferred embodiments. It should be understood, however, that the instant application is not limited to the precise arrangements and/or instrumentalities illustrated in the drawings, in which:

FIG. 7 is a perspective view of a partially disassembled conveyor system utilizing rectangular shaped conveyor base plates;

FIG. 8A is an exploded perspective view of a rectangular shaped conveyor base plate for use with the conveyor system illustrated in FIG. 7, constructed in accordance with an embodiment;

FIG. 8B is an exploded perspective view the base plate illustrated in FIG. 8A, constructed in accordance with an alternative embodiment.

DETAILED DESCRIPTION OF ILLUSTRATIVE EMBODIMENTS

Figure 1:
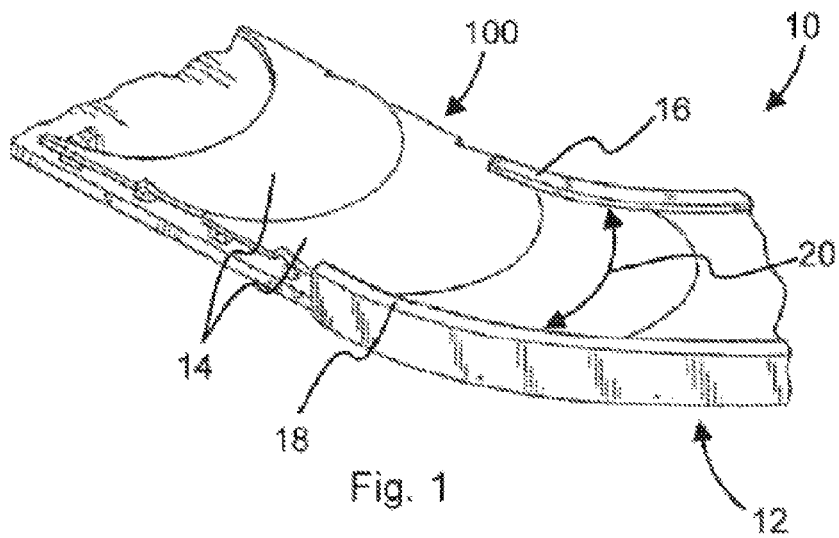
FIG. 1 is a perspective view of a partially disassembled conveyor system utilizing crescent shaped conveyor base plates.

Certain terminology is used in the following description for convenience only and is not limiting. The words "right", "left", "top," "bottom," "upper," and "lower" designate directions in the drawings to which reference is made. The words "inward," "inwardly," "outward," and "outwardly" refer to directions toward and away from, respectively, the geometric center of the device to which reference is made and/or designated parts thereof. The terminology intended to be non-limiting includes the above-listed words, derivatives thereof and words of similar import.

Referring initially to FIG. 1, an example embodiment of a content displaying conveyor system 10 is illustrated. The content displaying conveyor system 10 can include at least one, such as a plurality of content displaying conveyor plates 100. The illustrated content displaying conveyor system 10 includes a baggage carousel system, or carousel 12. The carousel 12 includes a plurality of conveyor system base plates 14, at least one of which can be configured as a content displaying conveyor plates 100. The base plates 14 move around the carousel 12 in an endless loop, such that luggage or other items disposed on the base plates 14 will be continuously conveyed around the perimeter of the carousel 12. The base plates 14 are coupled to a corresponding plurality of spaced apart attachment members 31 connected to the drive system of the carousel 12, such that the base plates 14 are conveyed continuously around the perimeter of the carousel 12 by the attachment members 31. The base plates 14 define respective upper surfaces that are substantially parallel to the underlying surface upon which the carousel 12 is constructed.

The carousel 12 further includes inner rails 16 and opposing outer rails 18 disposed along the edges of the base plates 14 around the perimeter of the carousel 12, the inner and outer rails 16 and 18 configured to retain objects on the base plates 14 as they move around the carousel. Each base plate 14 of the carousel 12 defines a viewable space 20 along its upper surface between the inner and outer rails 16 and 18, respectively. Advertising content can be affixed to at least one, up to an entirety of the base plates 14, thereby defining at least one, such as a plurality of discrete content display sections. For example, a single portion of content can be divided and coupled to a plurality of adjacent base plates 14, up to an entirety of the base plates 14 such that as the adjacent base plates 14 move around the carousel 12, the adjacent base plates 14 appear to define a single continuous portion of content. The structure of the carousel 12 will not be described in greater detail as it is well known to those skilled in the art. It should be appreciated that the content displaying conveyor system 10 is not limited to use with the illustrated baggage carousel 12, and that the content displaying conveyor system 10 can alternatively be used with any other suitable conveyor system.

Figure 2:
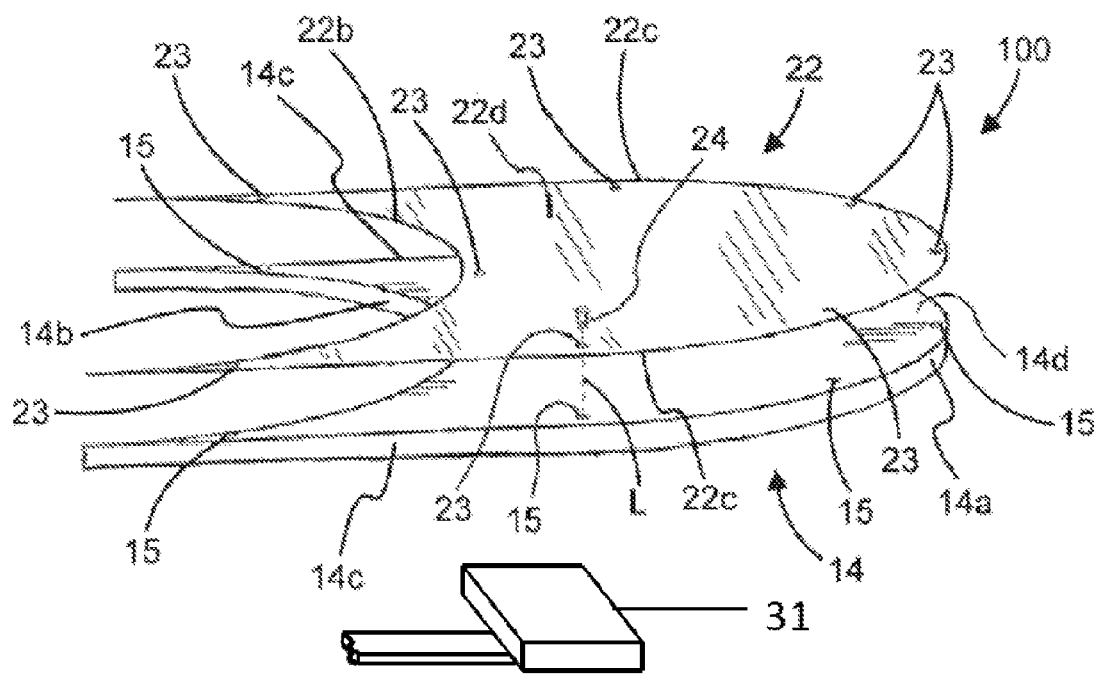
FIG. 2 is an exploded perspective view of a crescent shaped conveyor base plate for use with the conveyor system illustrated in FIG. 1, constructed in accordance with an embodiment.
Figure 3:
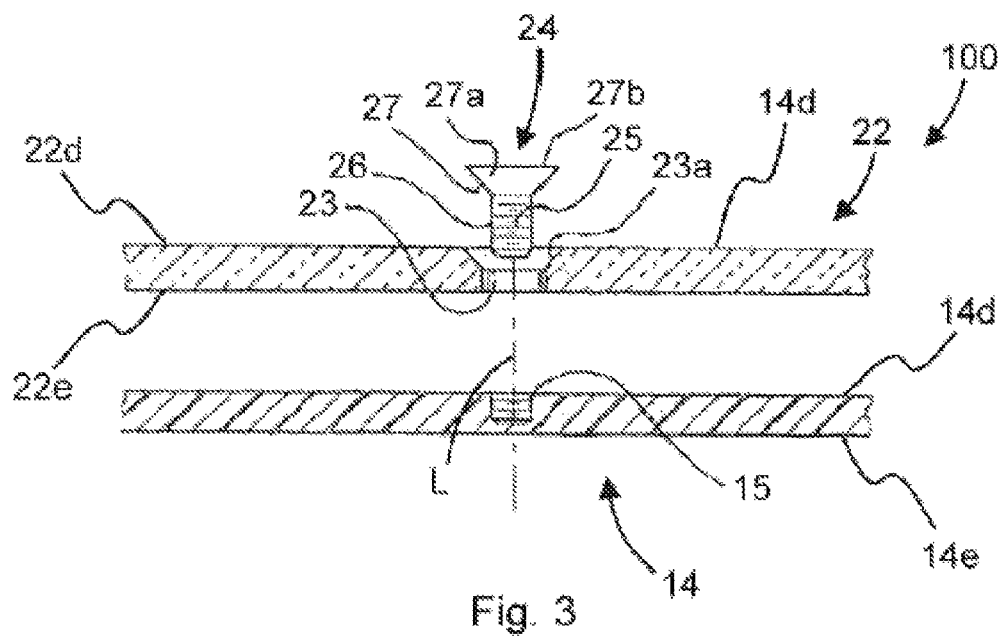
FIG. 3 is a sectional side elevation view of a portion of the base plate illustrated in FIG. 2.
Figure 4:
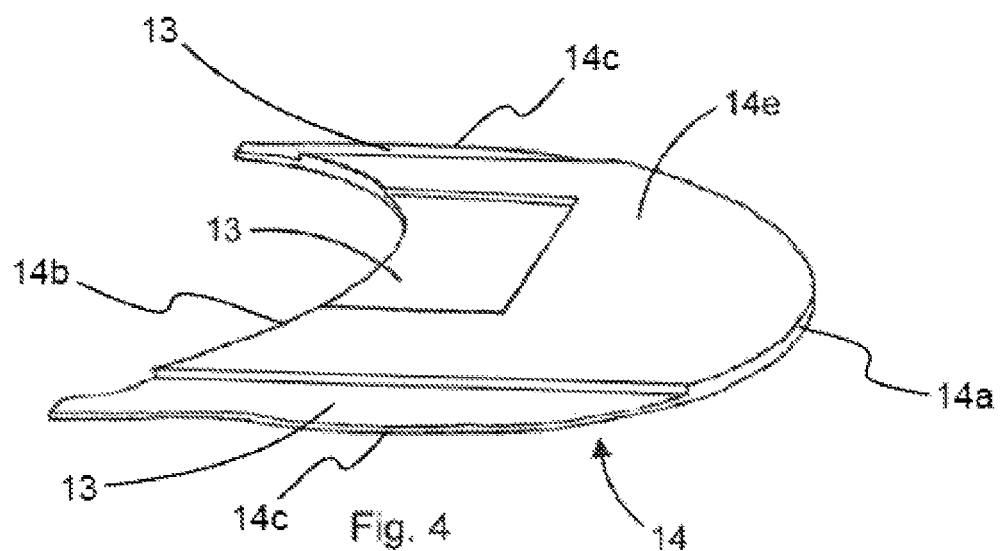
FIG. 4 is a perspective view of the lower surface of the base plate illustrated in FIG. 2.

Referring now to FIGS. 2-4, an example embodiment of a content displaying conveyor plate 100 for use with the content displaying conveyor system 10 is illustrated. The illustrated content displaying conveyor plate 100 includes a number of components, in particular a conveyor base plate, or base plate 14 and an upper plate 22. The base plate 14 can be constructed of any suitable material, such as stainless steel, hot rolled steel, cold rolled steel, aluminum, KYDEX®, or any other suitable material. The outer surfaces of the base plate 14 can be coated with a polymer material. The illustrated base plate 14 is substantially crescent shaped, and defines a leading edge 14a, an opposing trailing edge 14b, and opposing side edges 14c. The leading, trailing, and side edges 14a-c define an enclosed perimeter of the base plate 14. The base plate 14 further defines an upper surface 14d and an opposing lower surface 14e. The thickness of the base plate, as defined between the upper and lower surfaces 14d-e, respectively, can be uniform throughout the base plate 14, can vary between the leading and trailing edges 14a-b, can vary between the side edges 14c, or any combination thereof. The illustrated base plate 14 has a thickness of about five eighths of an inch. The upper surface 14d of the illustrated base plate 14 defines a substantially planar surface, but can alternatively define other suitable surface geometries.

The lower surface 14e of the base plate 14 can be configured to be coupled to an attachment member 31 of the carousel 12 such that the base plate 14 will move along with the attachment member 31, as described above. A portion, up to the entirety of the lower surface 14e can be configured to couple to the attachment member 31 of the carousel 12 such that the height of the upper surface 14d of the base plate 14 is lowered with respect to the bottom edges of the inner and outer rails 16 and 18, thereby providing room for the installation and/or removal of other components of the content displaying conveyor plate 100, such as the upper plate 22. For example, the lower surface 14e of the illustrated base plate 14e can define at least one, such as a plurality of recesses 13, the recesses 13 configured to receive the attachment member 31 and/or other components of the carousel 12 therein. The recesses 13 can be configured such that the content displaying conveyor plate 100 can be coupled to a particular carousel, for instance carousel 12, without requiring any structural or other modifications to the carousel 12 that are typically required by existing baggage carousel advertising systems, such as raising the height of inner and/or outer rails 16 and 18 of the carousel 12 with respect to the base plates 14. It should be appreciated that the content displaying conveyor plate 100 is not limited to the illustrated recesses 13, and that the lower surface 14e of the base plate 14 can be differently constructed to include one or more recesses 13 of any suitable size, shape, and/or depth, for example to accommodate varying carousel attachment member geometries, additional functional carousel components such as rollers, and/or to define differing heights of the upper surface 14d of the base plate 14 with respect to the bottom edges of the inner and outer rails 16 and 18.

The upper surface 14d of the base plate 14 can define at least one, such as a plurality of connection members, the connection members configured to allow the upper plate 22 to be releasably coupled to the base plate 14. In the illustrated embodiment, the base plate 14 defines a plurality of connection members in the form of apertures 15 that extend into the upper surface 14d of the base plate 14 along central axes L that extend in a direction substantially perpendicular to the upper surface 14d. Alternatively, the apertures 15 can be defined through the base plate 14, for instance extending into the upper surface 14d and out the lower surface 14e. At least a portion of the inner surfaces of any number, such all of the apertures 15 can be threaded. One or more, up to the entirety of the connection members can be defined in the base plate 14 at the time of manufacture, for instance so that the content displaying conveyor plate 100 can be deployed as a replacement for an existing base plate 14 of a carousel 12. Alternatively, the base plate 14 can be modified so as to define one or more connection members while it is coupled to an attachment member 31, for instance in an assembled carousel 12. The apertures 15 of the illustrated base plate 14 are defined spaced apart from each other along the perimeter of the base plate 14, but can alternatively be defined in any other locations in the upper surface 14d as desired.

The illustrated upper plate 22 has a substantially crescent shape that conforms to the shape of the base plate 14, and defines a leading edge 22a, an opposing trailing edge 22b, and opposing side edges 22c. The leading, trailing, and side edges 22a-c define an enclosed perimeter of the upper plate 22 that substantially conforms to the closed perimeter of the base plate 14. The upper plate 22 further defines an upper, or display surface 22d and an opposing lower, or contact surface 22e. The contact surface 22e of the illustrated upper plate 22 defines a substantially planar surface such that the contact surface 22e conforms to the upper surface 14d of the base plate 14 when the upper plate 22 is coupled to the base plate 14, but can alternatively define other suitable surface geometries. The upper plate 22 can be constructed of any suitable material, such as plastic or some other suitable polymer or material capable of withstanding the wear and tear associated with placing and/or removing baggage from an exposed surface. Content display sheets 28 can be defined having various thicknesses. In a preferred embodiment, a content display sheet 28 of approximately one-fourth of an inch thickness is used.

The upper plate 22 can define at least one, such as a plurality of connection members, the connection members configured to interface with complimentary connection members defined by the base plate 14, so as to allow the upper plate 22 to be releasably coupled to the base plate 14. In the illustrated embodiment, the upper plate 22 defines a plurality of connection members in the form of apertures 23 that extend through the upper plate 22 along central axes L that extend in a direction substantially perpendicular to the upper surface 14d of the base plate 14. In the illustrated embodiment, the apertures 15 of the base plate 14 and the apertures 23 of the upper plate 22 are defined along common central axes L such that the apertures are substantially aligned with respect to each other when the upper plate 22 is disposed onto the base plate 14.

The apertures 15 and 23 of the illustrated content displaying conveyor plate 100 are aligned such that anchors, such as screws 24, can be inserted through corresponding apertures 23 and received in the apertures 15, thereby securing the upper plate 22 to the base plate 14 in a releasably coupled configuration. A portion, up to the entirety of the shafts 26 of the screws 24 can have threads 25 defined thereon, the threads 25 configured to engage with the threads defined in the apertures 15, such that as the screws 24 are tightened, the lower surface 27a of the heads 27 of the screws 24 engage with complimentary inner surfaces 23a of the apertures 23, such that the upper surfaces 27b of the heads 27 of the screws 24 will be flush with the display surface 22d of the upper plate 22 when fully inserted.

In use, the upper plate 22 can be installed and/or removed from the base plate 14 without removing the inner and/or outer rails 16 and 18 of the carousel 12. For example, in one method of assembly, the upper plate 22 can be rotated with respect to its coupled position and placed against the upper surface 14d of the base plate 14. The upper plate 22 can then be rotated so that its side edges 14c slide under the bottom edges of the inner and outer rails 16 and 18, respectively, and the upper plate 22 can be positioned such that the apertures 15 and 23 are aligned with respect to each other. Anchors, such as screws 24, can then be inserted into the apertures as described above and tightened to secure the upper plate 22 to the base plate 14. The upper plate 22 can similarly be removed by performing the above-described steps in reverse order. It should be appreciated that changing out the upper plate 22, and thus the content it displays, can be achieved quickly and with low installation overhead when compared with typical existing baggage carousel advertising systems.

It should be appreciated that the content displaying conveyor plate 100 is not limited to the illustrated connection members of apertures 15 and 23, and that the base plate 14 and/or the upper plate 22 can be differently constructed with any other connection members as desired. It should further be appreciated that the content displaying conveyor plate 100 is not limited to the illustrated crescent shaped base plate 14 and upper plate 22, and that the base plate 14 and/or the upper plate 22 can be differently constructed having any other suitable shape. It should further still be appreciated that the base plate 14 and the upper plate 22 can be constructed having the same or different shapes, as desired.

The display surface 22d of the upper plate 22 is configured to facilitate viewing of content integral with or contained within the content displaying conveyor plate 100, for example by travelers in the proximity of the carousel 12. Because the upper plate 22 substantially conforms to the shape of the base plate 14, substantially the entirety of the viewable space 20 defined by the upper surface 14d between the inner and outer rails 16 and 18, respectively, is made available for displaying content. The content displayed by the content displaying conveyor plate 100 can include any type of visual information and/or indicia, such as a printed message, an image, or any combination thereof. In a preferred embodiment, at least a portion, such as the entirety of the upper plate 22 is constructed of a substantially transparent material and the content is integral with the contact surface 22e of the upper plate 22, such that when the upper plate 22 is coupled to the base plate 14, the content is visible through the upper plate 22. The content can be integral with the contact surface 22e of the upper plate via any suitable process, for instance second surface printing onto the contact surface 22e, screen printing on the contact surface 22e, adhering the content to the contact surface 22e, or the like. It should be appreciated that alternatively, a portion, such as all, of the content can be integral with the upper surface 14d of the base plate 14.

In an alternative embodiment, the content can be integral with the display surface 22d of the upper plate, for example using techniques similar to those described for the upper plate 22. When the content is integral with the display surface 22d, the upper plate 22 can be alternatively constructed of a non-transparent material. Moreover, when the content is integral with the display surface 22d, the display surface 22d can optionally be coated with at least one layer of a protective material, for instance a hard laminate, so as to protect the content from damage and/or premature wear, for example from placement and/or removal of luggage from the content displaying conveyor plate 100. Of course discrete portions of content can be integral with both the contact surface 22e and the display surface 22d. In still another alternative embodiment, at least a portion, such as all of the content can be embedded within the upper plate 22, such as between the contact surface 22e and the display surface 22d, flush with the contact surface 22e, flush with the display surface 22d, or any combination thereof.

Figure 5:
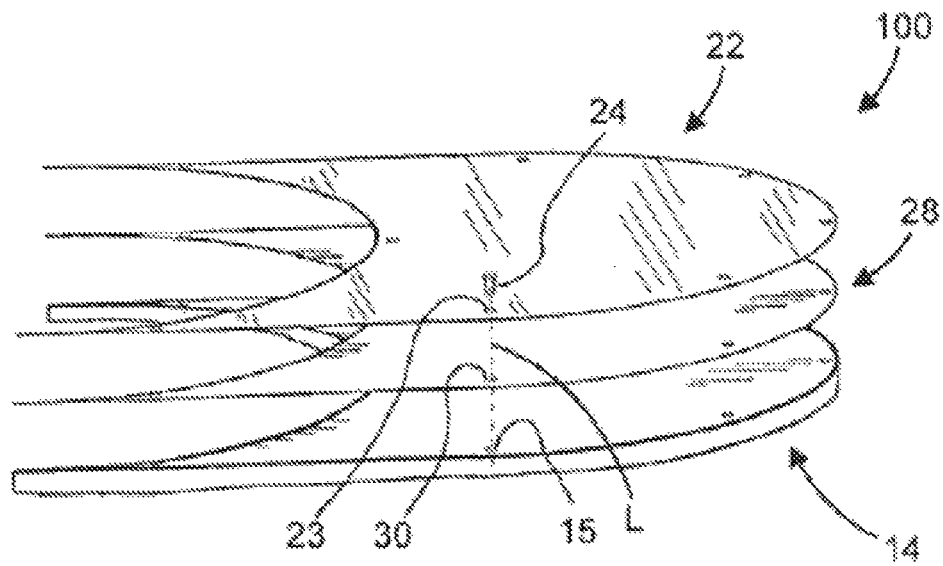
FIG. 5 is an exploded perspective view the base plate illustrated in FIG. 1, constructed in accordance with an alternative embodiment.
Figure 6:
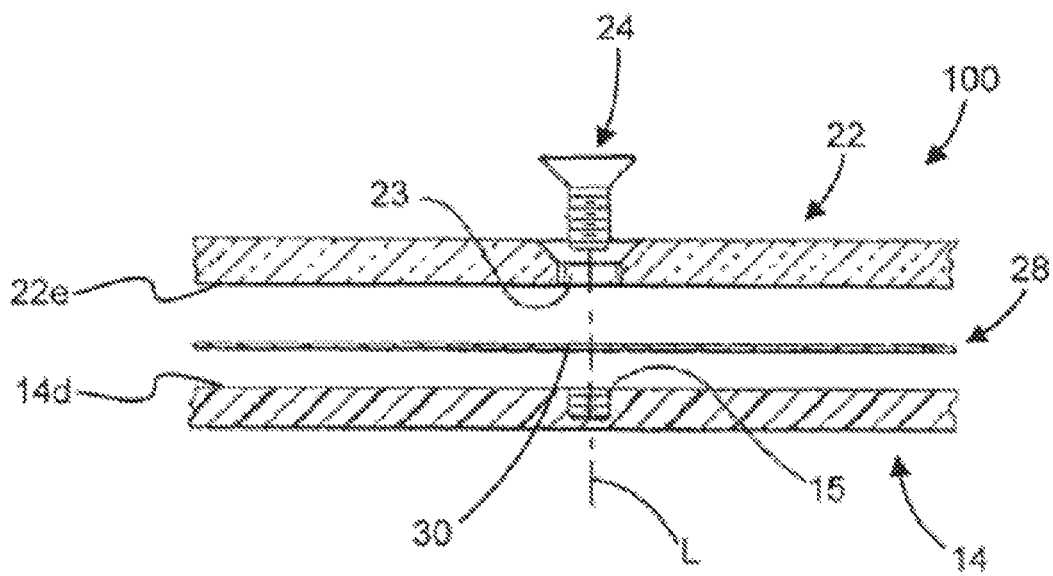
FIG. 6 is a sectional side elevation view of a portion of the base plate illustrated in FIG. 5.

Referring now to FIGS. 5-6, in still another alternative embodiment, the content can be provided as a separate component of the content displaying conveyor plate 100, for example as a content display sheet 28. Content display sheets 28 can be quickly and easily inserted or removed from the content displaying conveyor plate 100, for example by removing the upper plate 22 as described in more detail above. In the illustrated embodiment, the content display sheet 28 has a substantially crescent shape that conforms to the shape of the base plate 14 and the upper plate 22, and has a plurality of apertures 30 defined therethrough along central axes L that extend in a direction substantially perpendicular to the upper surface 14d of the base plate 14. The apertures 30 of the content display sheet 28, the apertures 15 of the base plate 14, and the apertures 23 of the upper plate 22 are defined along common central axes L such that the apertures are substantially aligned with respect to each other when the content display sheet 28 is disposed between the contact surface 22e of the upper plate 22 and the upper surface 14d of the base plate 14. The upper plate 22 can be constructed of a substantially transparent material such that when the upper plate 22 is coupled to the base plate 14, the content display sheet 28 is visible through the upper plate 22. It should be appreciated that the content display sheet 28 is not limited to the illustrated shape, and that the content display sheet 28 can be differently constructed having any suitable shape, for example such that the apertures 30 are omitted.

As described above, content can be displayed continuously or discontinuously. For example, a discreet portion of content, or indicia, may be divided so that it spans a plurality of adjacent content displaying conveyor plates 100, such that as the adjacent content displaying conveyor plates 100 move around the carousel 12, the adjacent content displaying conveyor plates 100 appear to define a single continuous portion of content. Alternatively, a single discreet portion of content can occupy a single content displaying conveyor plate 100. It should be appreciated that one or more individual base plates 14 or discreet sections of adjacent or nonadjacent base plates 14 of an existing conveyor system, such as carousel 12, can be replaced with adjacent and/or nonadjacent content displaying conveyor plates 100, thereby defining respective discreet content displaying portions of the carousel 12. Of course all the base plates 14 of the carousel 12 can be replaced with content displaying conveyor plates 100.

The process of replacing a base plate 14 of an existing conveyor system with a content displaying conveyor plate 100 can be achieved by removing a respective section of the inner rail 16 and/or outer rail 18, unfastening the existing base plate 14 from its respective carousel attachment member 31, fastening the replacement base plate 14 of the content displaying conveyor plate 100 to the carousel attachment member 31, and reinstalling the respective rail section(s). It should be appreciated that the content displaying conveyor system 10 thus provides a highly customizable advertising system with low installation overhead when compared with typical existing baggage carousel advertising systems.

Referring now to FIGS. 7-8B, the content displaying conveyor system 10 in use with an alternative type of conveyor system is illustrated. In particular, the illustrated content displaying conveyor system 10 includes a baggage carousel system, or carousel 112. Carousel 112 is also known as an incline plate baggage carousel, and functions in an endless loop similarly to carousel 12. Carousel 112 includes base plates 114 that define respective upper surfaces that are inclined with respect to the underlying surface upon which the carousel 112 is constructed. Each of the base plates 114 define a viewable space 120 along its upper surface between the upper and lower rails 116 and 118, respectively. It should be appreciated the base plate 114, the upper plate 122, and/or the content display sheet 128 of the illustrated embodiment of the illustrated content displaying conveyor plate 100 are defined having rectangular shapes, but otherwise function substantially identically to the base plate 14, the upper plate 22, and the content display sheet 28 described above.

One or more content displaying conveyor plates 100 of the content displaying conveyor system 10 can be configured such that the upper plate 22 is illuminated from within the content displaying conveyor plate 100. For example, one or more light sources, such as electroluminescent panels, light emitting diodes (LEDs), or the like can be embedded within the upper surface 14d of the base plate 14, within the contact surface 22e of the upper plate 22, within the display surface 22d of the upper plate 22, or any combination thereof. The light source can be electrically coupled to a power source, such as a battery pack, the battery pack disposed into the content displaying conveyor plate 100, for example in the recess 13. Alternatively, the light source may derive power from contact between one or more power intake members defined on the base plate 14 and one or more complimentary power source members defined on the carousel 12.

Although the components of the content displaying conveyor system 10 and the content displaying conveyor plates 100 have been described herein with reference to preferred embodiments or preferred methods, it should be understood that the words which have been used herein are words of description and illustration, rather than words of limitation. For example, it should be noted that although the content displaying conveyor system 10 and the content displaying conveyor plates 100 have been described herein with reference to particular structure, methods, and/or embodiments, the scope of the instant disclosure is not intended to be limited to those particulars, but rather is meant to extend to all structures, methods, and/or uses of the content displaying conveyor system 10 and/or the content displaying conveyor plates 100. Those skilled in the relevant art, having the benefit of the teachings of this specification, may effect numerous modifications to the content displaying conveyor system 10 and/or the content displaying conveyor plates 100 as described herein, and changes may be made without departing from the scope and spirit of the instant disclosure, for instance as recited in the appended claims.

What is claimed:

1. A content displaying conveyor plate for retrofitting an existing conveyor system to display content on the conveyor system by removing a preexisting conveyor base plate from the conveyor system and replacing it with the content displaying conveyor plate, the content displaying conveyor plate consisting essentially of:

a base plate having a leading, a trailing, and opposing side edges between the leading and trailing edges defining a perimeter for the base plate, a plurality of first connection members, an upper surface extending to the perimeter and an opposing lower surface configured to be directly attached to the conveyor system, wherein the lower surface includes means for connecting directly to the conveyor system, and wherein the base plate upper surface is a flat, planar surface; and an upper plate having a leading, a trailing, and opposing side edges between the leading and trailing edges defining an upper plate perimeter, a plurality of second connection members that align with the base plate connection members, the upper plate having a lower, flat, planar contact surface extending to the upper plate perimeter and facing the base plate upper surface and an upper, flat, planar display surface, the upper plate configured to be releasably coupled to the upper surface of the base plate; and visual content located on or above the upper surface of the base plate;

wherein the upper plate is coupled to the base plate such that the content is displayed by the upper plate.

2. The content displaying conveyor plate as recited in claim 1, wherein the visual content is a content display sheet disposed between the base plate and the upper plate.

3. The content displaying conveyor plate as recited in claim 1, wherein the connection members are apertures.

4. The content displaying conveyor plate as recited in claim 3, wherein the apertures are aligned along a common axis that is substantially perpendicular to the upper surface of the base plate.

5. The content displaying conveyor plate of claim 4, wherein the apertures of the base plate are threaded.

6. The content displaying conveyor plate of claim 1, wherein the upper plate is substantially transparent.

7. The content displaying conveyor plate of claim 1, wherein the visual content is integral with the upper plate.

8. The content displaying conveyor plate of claim 7, wherein the content is integral with the contact surface of the upper plate.

9. The content displaying conveyor plate of claim 7, wherein the content is integral with the display surface of the upper plate.

10. The content displaying conveyor plate of claim 1, wherein the first and second pluralities of apertures are defined along the periphery of the upper plate.

11. The content displaying conveyor plate of claim 1, wherein at least one recess is defined in the lower surface, the at least one recess configured to receive an attachment member of a conveyor system.

12. A content displaying conveyor system comprising:

a plurality of content displaying conveyor plates for retrofitting an existing conveyor system to display content on the conveyor system by removing preexisting conveyor base plates from the conveyor system and replacing them with the content displaying conveyor plates, the content displaying conveyor plates, each plate consisting essentially of:

a base plate having a leading, a trailing, and opposing side edges between the leading and trailing edges defining a perimeter for the base plate, a plurality of first connection members, an upper surface extending to the perimeter and an opposing lower surface configured to be directly attached to the conveyor system, wherein the lower surface includes means for connecting directly to the conveyor system, and wherein the base plate upper surface is a flat, planar surface; and an upper plate having a leading, a trailing, and opposing side edges between the leading and trailing edges defining an upper plate perimeter, a plurality of second connection members that align with the base plate connection members, the upper plate having a lower, flat, planar contact surface extending to the upper plate perimeter and facing the base plate upper surface and an upper, flat, planar display surface, the upper plate configured to be releasably coupled to the upper surface of the base plate; and visual content located on or above the upper surface of the base plate;

wherein the upper plate is coupled to the base plate such that the content is displayed by the upper plate.

13. The content displaying conveyor system as recited in claim 12, wherein the visual content is a content display sheet disposed between the base plate and the upper plate for each plate.

14. The content displaying conveyor system as recited in claim 12, wherein the visual content is integral with the contact surface of the upper plate for each plate.

15. A method for retrofitting an existing carousel conveyor system to display advertising content on the conveyor system, comprising the steps of:

(a) removing at least a section of one of an inner or an outer rail of the carousel conveyor system located a preexisting height above an upper surface of a preexisting base conveyor plate;

(b) removing at least one preexisting base conveyor plate from the conveyor system where the removed preexisting plate was located adjacent the removed section of the rail and the preexisting base conveyor plate does not contain any visual content layer;

(c) installing at least one replacement content displaying conveyor plate to replace the removed preexisting base plate by connecting the replacement plate to the carousel conveyor system, the replacement content displaying conveyor plate consisting essentially of:

1) a base plate having a leading, a trailing, and opposing side edges between the leading and trailing edges defining a perimeter for the base plate, a plurality of first connection members, an upper surface extending to the perimeter and an opposing lower surface configured to be directly attached to a conveyor system, wherein the base plate upper surface is a flat, planar surface; and 2) a first upper plate having a leading, a trailing, and opposing side edges between the leading and trailing edges defining an upper plate perimeter, a plurality of second connection members that align with the base plate connection members, the upper plate having a lower, flat, planar contact surface extending to the upper plate perimeter and facing the base plate upper surface and an upper, flat, planar display surface, the upper plate releasably secured to the upper surface of the base plate; and 3) visual content located on or above the upper surface of the base plate; wherein the upper plate is secured to the base plate such that the content is displayed by the upper plate; and (d) reinstalling the removed at least a section of one of the inner or the outer rail such that the removed rail section is not modified with respect to the preexisting height.

16. The method of claim 15, wherein the visual content is a content display sheet disposed between the base plate and the upper plate.

17. The method of claim 15, wherein the connection members are threaded apertures.

18. The method of claim 16, further comprising the step of removing the upper plate from the replacement plate and then removing the visual content display sheet, and then securing a second upper plate to the base plate, where the second upper plate has a leading, a trailing, and opposing side edges between the leading and trailing edges defining a second upper plate perimeter, a plurality of second upper plate connection members that align with the base plate connection members, the second upper plate having a lower, flat, planar contact surface extending to the second upper plate perimeter and facing the base plate upper surface and an upper, flat, planar display surface, the second upper plate releasably secured to the upper surface of the base plate.

19. The method of claim 18, further comprising the step of installing a new visual content display sheet disposed between the base plate and the second upper plate.

20. The method of claim 19, wherein the first upper plate is originally secured to the base plate by way of screws extending through the apertures of the upper plate and the base plate, and the screws are removed to replace the visual content display sheet and the upper plate is secured to the base plate by way of screws extending through the apertures.

21. The method of claim 19, wherein the step of removing the visual content display sheet and installing new visual content display sheet is conducted without removing either the inner or the outer rail.

22. The method of claim 15, wherein the visual content is integral with the contact surface of the upper plate.

\* \* \* \* \*